United States Patent [19]

Seki

[11] Patent Number: 5,636,514
[45] Date of Patent: Jun. 10, 1997

[54] CATALYST DETERIORATION-DETERMINING SYSTEM FOR INTERNAL COMBUSTION ENGINES

[75] Inventor: Yasunari Seki, Wako, Japan

[73] Assignee: Honda Giken Kogyo Kabushiki Kaisha, Tokyo, Japan

[21] Appl. No.: 556,451

[22] Filed: Nov. 15, 1995

[30] Foreign Application Priority Data

Nov. 17, 1994 [JP] Japan .................................. 6-308229
Nov. 18, 1994 [JP] Japan .................................. 6-309860

[51] Int. Cl.⁶ .................................................... F01N 3/00
[52] U.S. Cl. ..................................................... 60/277
[58] Field of Search .............................. 60/277, 274, 285

[56] References Cited

U.S. PATENT DOCUMENTS

| | | | |
|---|---|---|---|
| 5,259,189 | 11/1993 | Baier et al. | 60/277 |
| 5,357,750 | 10/1994 | Ito et al. | 60/277 |
| 5,357,754 | 10/1994 | Ogawa et al. | 60/285 |
| 5,386,695 | 2/1995 | Iwata et al. | 60/277 |
| 5,416,710 | 5/1995 | Kuroda et al. | 60/285 |
| 5,417,061 | 5/1995 | Maeda et al. | 60/277 |
| 5,448,886 | 9/1995 | Toyoda | 60/277 |
| 5,542,248 | 8/1996 | Iwata et al. | 60/285 |

FOREIGN PATENT DOCUMENTS 6-212955  8/1994  Japan .

*Primary Examiner*—John T. Kwon
*Attorney, Agent, or Firm*—Nikaido, Marmelstein, Murray & Oram LLP

[57] ABSTRACT

A catalyst deterioration-detecting system for an internal combustion engine detects deterioration of a catalyst arranged in an exhaust passage of the engine based on the output from an oxygen concentration sensor arranged in the exhaust passage at a location downstream of the catalyst, during execution of air-fuel ratio control. The detection of deterioration of the catalyst is effected based on a value of a catalyst deterioration parameter indicative of a degree of deterioration of the catalyst, and an amount of variation in an air-fuel ratio control amount used in the air-fuel ratio control.

7 Claims, 13 Drawing Sheets

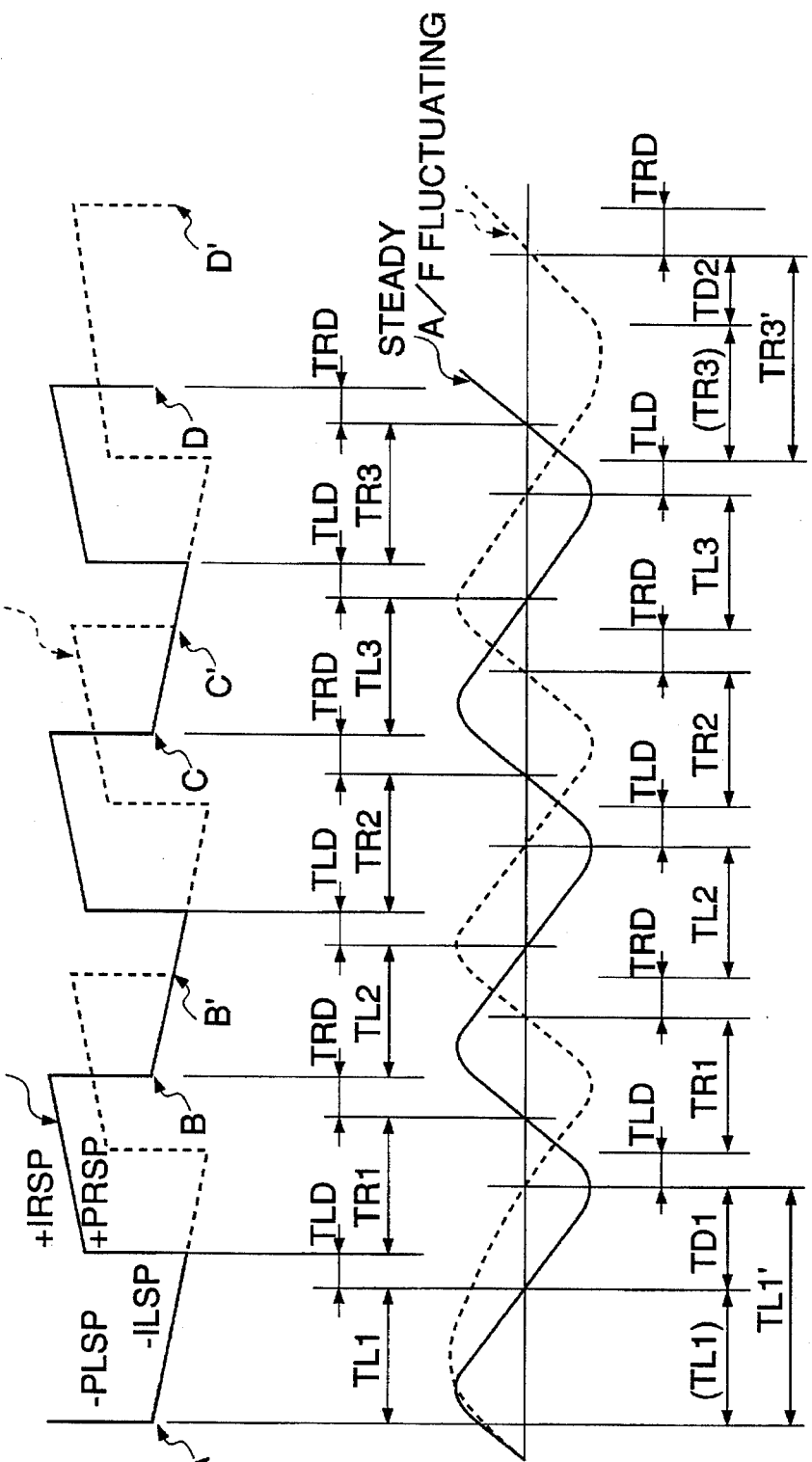
FIG.13A KO2
FIG.13B RVO2

CATALYST DETERIORATION-DETERMINING SYSTEM FOR INTERNAL COMBUSTION ENGINES

BACKGROUND OF THE INVENTION

1. Field of the Invention

This invention relates to a catalyst deterioration-determining system for detecting deterioration of a catalyst arranged in an exhaust passage of the internal combustion engine for purifying noxious components contained in exhaust gases emitted from the engine.

2. Prior Art

A technique for detecting deterioration of a catalyst arranged in an exhaust passage of an internal combustion engine for purifying noxious components contained in exhaust gases emitted from the engine has already been proposed by the present assignee in Japanese Laid-Open Patent Publication (Kokai) No. 6-212955, in which while the feedback control of the air-fuel ratio of a mixture supplied to the engine is executed in response to the output from an oxygen concentration sensor arranged in the exhaust passage at a location downstream of the catalyst (hereinafter referred to as "the downstream oxygen concentration sensor"), the inversion period of the output from the downstream oxygen concentration sensor occurring during the feedback control is utilized in detecting deterioration of the catalyst.

However, this conventional technique is based on the assumption that the engine is in a steady operating condition. Accordingly, when the air-fuel ratio of the mixture supplied to the engine fluctuates due to changes in the operating condition of the engine, it results in variations in the measured inversion period of the output from the downstream oxygen concentration sensor, which impedes accurate determination of the catalyst deterioration.

Further, the above-mentioned publication also discloses "a quick OK determination method" in which once a measured time period between inversions of the output from the downstream oxygen concentration sensor is longer than a predetermined time period, it is quickly determined that the catalyst is normal, followed by terminating the monitoring for catalyst deterioration.

However, this quick OK determination method is also based on the assumption that the engine is in a steady operating condition, so that when the air-fuel ratio of the mixture supplied to the engine fluctuates, there can be made an erroneous determination that the catalyst is normal, even when it is actually deteriorated. For example, in the case of an engine equipped with an evaporative emission control system for purging temporarily-stored or adsorbed evaporative fuel to the intake system when the engine is in a predetermined operating condition, when the purging of evaporative fuel is executed during deceleration of the engine, the output from the downstream oxygen concentration sensor can continuously indicate that the air-fuel ratio is rich for a relatively long time period, i.e. it can remain uninverted for a long time period. In such an event, there can be made an erroneous determination that the catalyst is normal, even when the catalyst is actually deteriorated.

SUMMARY OF THE INVENTION

It is an object of the invention to provide a catalyst deterioration-determining system for an internal combustion engine, which is capable of detecting deterioration of a catalyst of the engine with higher accuracy even if the air-fuel ratio of a mixture supplied to the engine fluctuates in response to changes in the operating condition of the engine.

To attain the above object, according to a first aspect of the invention, there is provided a catalyst deterioration-detecting system for an internal combustion engine having an exhaust system, catalyst means arranged in the exhaust system for purifying exhaust gases emitted from the engine, oxygen concentration-detecting means arranged in the exhaust system at a location downstream of the catalyst means, for detecting concentration of oxygen in the exhaust gases, air-fuel ratio control amount-calculating means responsive to an output from the oxygen concentration-detecting means, for calculating an air-fuel ratio control amount, air-fuel ratio control means for controlling an air-fuel ratio of a mixture supplied to the engine by the use of the air-fuel ratio control amount, and catalyst deterioration-detecting means for detecting deterioration of the catalyst means based on the output from the downstream oxygen concentration-detecting means during execution of air-fuel ratio control by the air-fuel ratio control means.

The catalyst deterioration-detecting system according to the first aspect of the invention is characterized in that the catalyst deterioration-detecting means detects deterioration of the catalyst means based on a value of a catalyst deterioration parameter indicative of a degree of deterioration of the catalyst means, and an amount of variation in the air-fuel ratio control amount.

Preferably, the amount of variation in the air-fuel ratio control amount is a cumulative value of a difference between two adjacent values of the air-fuel ratio control amount measured immediately after proportional term control carried out by the air-fuel ratio control means.

More preferably, the amount of variation in the air-fuel ratio control amount is an average value of the cumulative value of the difference between two adjacent values of the air-fuel ratio control amount over a predetermined time period.

Further preferably, the catalyst deterioration parameter is a time period from execution of the proportional term control to inversion of the output from the oxygen concentration-detecting means, the catalyst deterioration-detecting means detecting the deterioration of the catalyst means by the use of an amount obtained by subtracting an amount ascribed to the amount of variation in the air-fuel ratio control amount obtained by dividing the cumulative value of the difference between two adjacent values of the air-fuel ratio control amount over the predetermined time period by an integral term applied in the air-fuel ratio control, from an average value of the catalyst deterioration parameter over the predetermined time period.

Preferably, the catalyst deterioration-detecting means includes deterioration detection-inhibiting means for inhibiting detection of deterioration of the catalyst means when the amount in variation of the air-fuel ratio control amount exceeds a predetermined value.

To attain the object, according to a second aspect of the invention, there is provided a catalyst deterioration-detecting system for an internal combustion engine having an exhaust system, catalyst means arranged in the exhaust system for purifying exhaust gases emitted from the engine, upstream oxygen concentration-detecting means arranged in the exhaust system at a location upstream of the catalyst means, for detecting concentration of oxygen in the exhaust gases, downstream oxygen concentration-detecting means arranged in the exhaust system at a location downstream of the catalyst means, for detecting concentration of oxygen in the exhaust gases, air-fuel ratio control means responsive to at least one of an output from the upstream oxygen concentration-detecting means and an output from the downstream oxygen concentration-detecting means, for controlling an air-fuel ratio of a mixture supplied to the engine, and catalyst deterioration-detecting means for detecting deterioration of the catalyst means based on the output from the downstream oxygen concentration-detecting means during execution of air-fuel ratio control by the air-fuel ratio control means.

The catalyst deterioration-detecting system according to the second aspect of the invention is characterized in that the catalyst deterioration-detecting means comprises:

determination time period-measuring means for measuring a determination time period during which the output from the upstream oxygen concentration-detecting means is on an opposite side with respect to a predetermined value to the output from the downstream oxygen concentration-detecting means; and inhibiting means for inhibiting detection of deterioration of the catalyst when the determination time period measured by the determination time period-measuring means exceeds a predetermined time period.

Preferably, the catalyst deterioration-detecting comprises detecting means for detecting a variation in the output from the downstream oxygen concentration-detecting means, over a predetermined time period, and determining means for determining that the catalyst means is normal when the determining time period measured by the determination time period-measuring means exceeds the predetermined time period.

The above and other objects, features, and advantages of the invention will become more apparent from the following detailed description taken in conjunction with the accompanying drawings.

BRIEF DESCRIPTION OF THE DRAWINGS

FIGS. 13A and 13B collectively form a timing chart which is useful in explaining a manner of correcting a deterioration-determining time period (TCHK) carried out when the air-fuel ratio is fluctuating.

DETAILED DESCRIPTION

The invention will now be described in detail with reference to the drawings showing an embodiment thereof.

Figure 1:
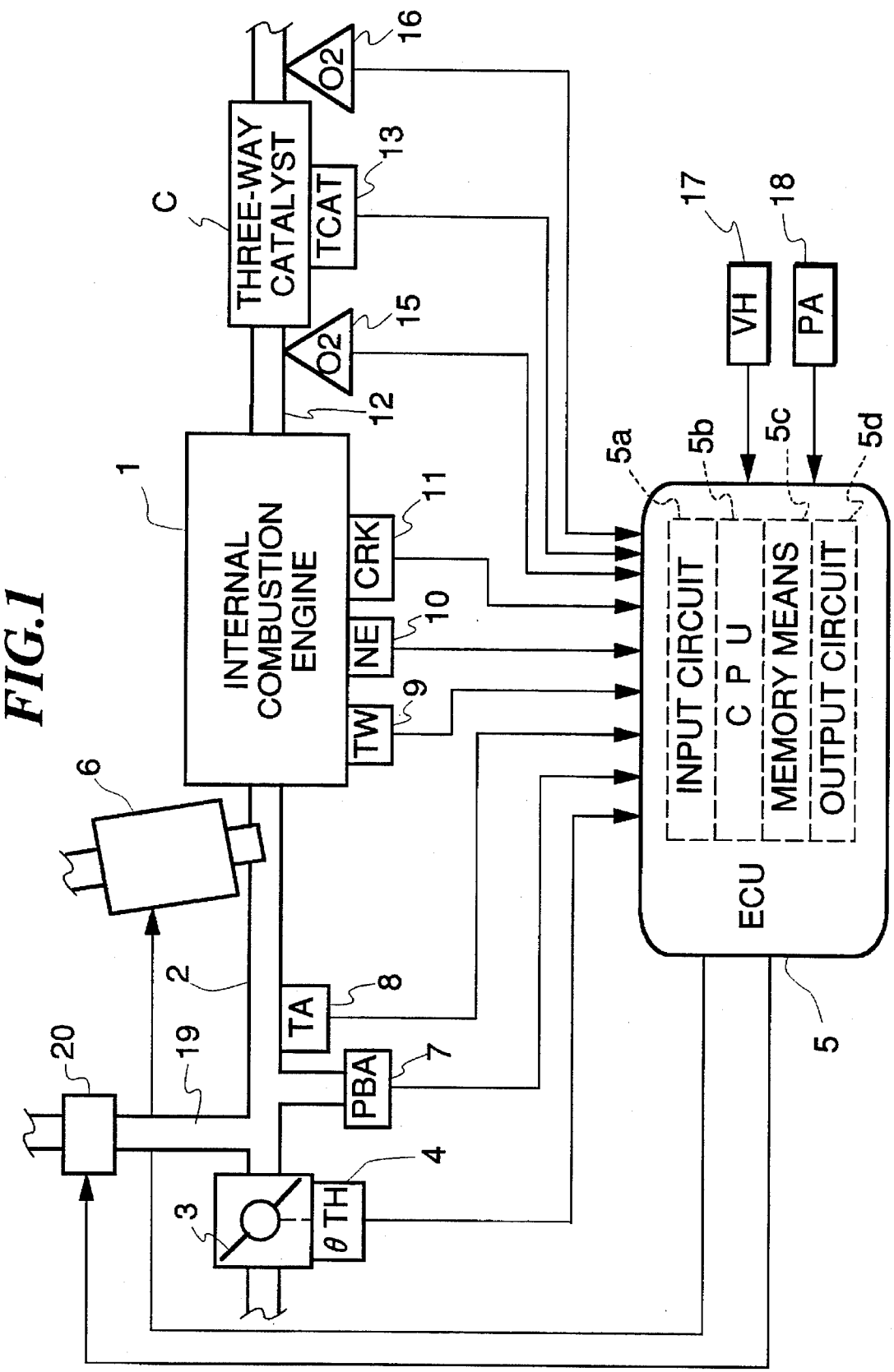
FIG. 1 is a block diagram showing the whole arrangement of an internal combustion engine and a control system therefor, which incorporates a catalyst deterioration-detecting system according to an embodiment of the invention.

Referring first to FIG. 1, there is shown the whole arrangement of an internal combustion engine (hereinafter simply referred to as "the engine") and a control system therefor, which incorporates a catalyst deterioration-determining system according to an embodiment of the invention. In the Figure, reference numeral 1 designates an internal combustion engine for automotive vehicles.

Connected to the cylinder block of the engine 1 is an intake pipe 2 in which is arranged a throttle valve 3. A throttle valve opening (θ TH) sensor 4 is connected to the throttle valve 3 for generating an electric signal indicative of the sensed throttle valve opening and supplying same to an electronic control unit hereinafter referred to as "the ECU") 5.

Fuel injection valves 6, only one of which is shown, are inserted into the interior of the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is provided in communication with the interior of the intake pipe 2 at a location immediately downstream of the throttle valve 3 for supplying an electric signal indicative of the sensed absolute pressure within the intake pipe 2 to the ECU 5. An intake air temperature (TA) sensor 8 is inserted into the intake pipe 2 at a location downstream of the intake pipe absolute pressure sensor 7 for supplying an electric signal indicative of the sensed intake air temperature TA to the ECU 5.

An engine coolant temperature (TW) sensor 9, which may be formed of a thermistor or the like, is mounted in the cylinder block of the engine 1, for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The engine rotational speed sensor 10 generates a pulse as a TDC signal pulse at each of predetermined crank angles whenever the crankshaft rotates through 180 degrees, and supplies the same to the ECU 5. The CRK sensor 11 generates a pulse as a CRK signal pulse at each of predetermined crank angles whenever the crankshaft rotates through 45 degrees, and supplies the same to the ECU 5.

A three-way catalyst (hereinafter referred to as "the catalyst") 14 is arranged within an exhaust pipe 12 connected to the cylinder block of the engine 1 for purifying noxious components such as HC, CO, and NOx. O2 sensors 15, 16 as oxygen concentration sensors are mounted in the exhaust pipe 12 at locations upstream and downstream of the three-way catalyst 14, respectively, for sensing the concentration of oxygen present in exhaust gases emitted from the engine 1 and supplying respective electric signals FVO2, RVO2 indicative of the sensed concentration values thereof to the ECU 5. Further, a catalyst temperature (TCAT) sensor 13 is mounted on the three-way catalyst 14 for detecting the temperature of the same and supplying a signal indicative of the detected catalyst temperature TCAT to the ECU 5.

A vehicle speed (VH) sensor 17 and an atmospheric pressure (PA) sensor 18 are electrically connected to the ECU 5 for detecting the vehicle speed VH and the atmospheric pressure PA, respectively, and supplying respective signals indicative of the detected vehicle speed VH and atmospheric pressure PA to the ECU 5.

A purge control valve 20 is arranged in a passage 19 via which a canister, not shown, for adsorbing evaporative fuel generated from a fuel tank, not shown, is connected to the intake pipe 2. The purge control valve 20 is connected to the ECU 5 to have its opening/closing operation controlled by a driving signal therefrom. The purge control valve 20 is opened when the engine is in a predetermined operating condition to supply evaporative fuel stored in the canister into the intake pipe 2.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, a memory means 5c storing various operational programs which are executed in the CPU 5b, and for storing results of calculations therefrom, etc., and an output circuit 5d which outputs driving signals to the fuel injection valves 6, etc.

The CPU 5b operates in response to the above-mentioned signals from the sensors to determine various operating conditions in which the engine 1 is operating, such as an air-fuel ratio feedback control region in which the air-fuel ratio is controlled in response to the detected oxygen concentration in the exhaust gases, and open-loop control regions other than the air-fuel ratio feedback control region, and calculates, based upon the determined operating conditions, the valve opening period or fuel injection period TOUT over which the fuel injection valves 6 are to be opened, by the use of the following equation (1) in synchronism with inputting of TDC signal pulses to the ECU 5:

$$TOUT = Ti \times KO2 \times K1 + K2 \quad (1)$$

where Ti represents a basic value of the fuel injection period TOUT of the fuel injection valves 6, which is determined in accordance with the engine rotational speed NE and the intake pipe absolute pressure PBA.

KO2 represents an air-fuel ratio feedback control correction coefficient whose value is determined in response to values of the oxygen concentration in the exhaust gases detected by the O2 sensors 15, 16 during air-fuel ratio feedback control, while it is set to respective predetermined appropriate values while the engine is in the open-loop control regions.

K1 and K2 represent other correction coefficients and correction variables, respectively, which are calculated based on various engine operating parameter signals to such values as to optimize characteristics of the engine such as fuel consumption and driveability depending on operating conditions of the engine.

The CPU 5b supplies, through the output circuit 5d, the fuel injection valves 6 with driving signals corresponding to the calculated fuel injection period TOUT determined as above, over which the fuel injection valves 6 are opened, and the purge control valve 20 with the aforementioned driving signal to control the opening and closing thereof.

Next, a manner of detecting deterioration (deterioration monitoring) of the catalyst 14 will be described.

Determination of deterioration of the catalyst 14 is carried out during execution of the air-fuel ratio feedback control which is carried out in response to an output RVO2 from the downstream O2 sensor 16 alone. The CPU 5b generates a special P term PLSP for skipping the value of the air-fuel ratio correction coefficient KO2 from a richer side to a leaner side with respect to a stoichiometric air-fuel ratio when the O2 sensor output RVO2 is inverted from a leaner side to a richer side with respect to a predetermined reference voltage RVREF, and then measures a time period TL elapsed from the time of generation of the special P term PLSP to the time the O2 sensor output RVO2 is inverted from the richer side to the leaner side. Similarly, the CPU 5b generates a special P term PRSP for skipping the value of the air-fuel ratio correction coefficient KO2 from the leaner side to the richer side with respect to the stoichiometric air-fuel ratio when the O2 sensor output RVO2 is inverted from the richer side to the leaner side with respect to the predetermined reference voltage RVREF, and then measures a time period TR elapsed from the time of generation of the special P term PRSP to the time O2 sensor output RVO2 is inverted from the leaner side to the richer side. Based upon the inversion time periods TL, TR thus measured, it is determined whether or not the catalyst 14 is deteriorated.

Figure 2:
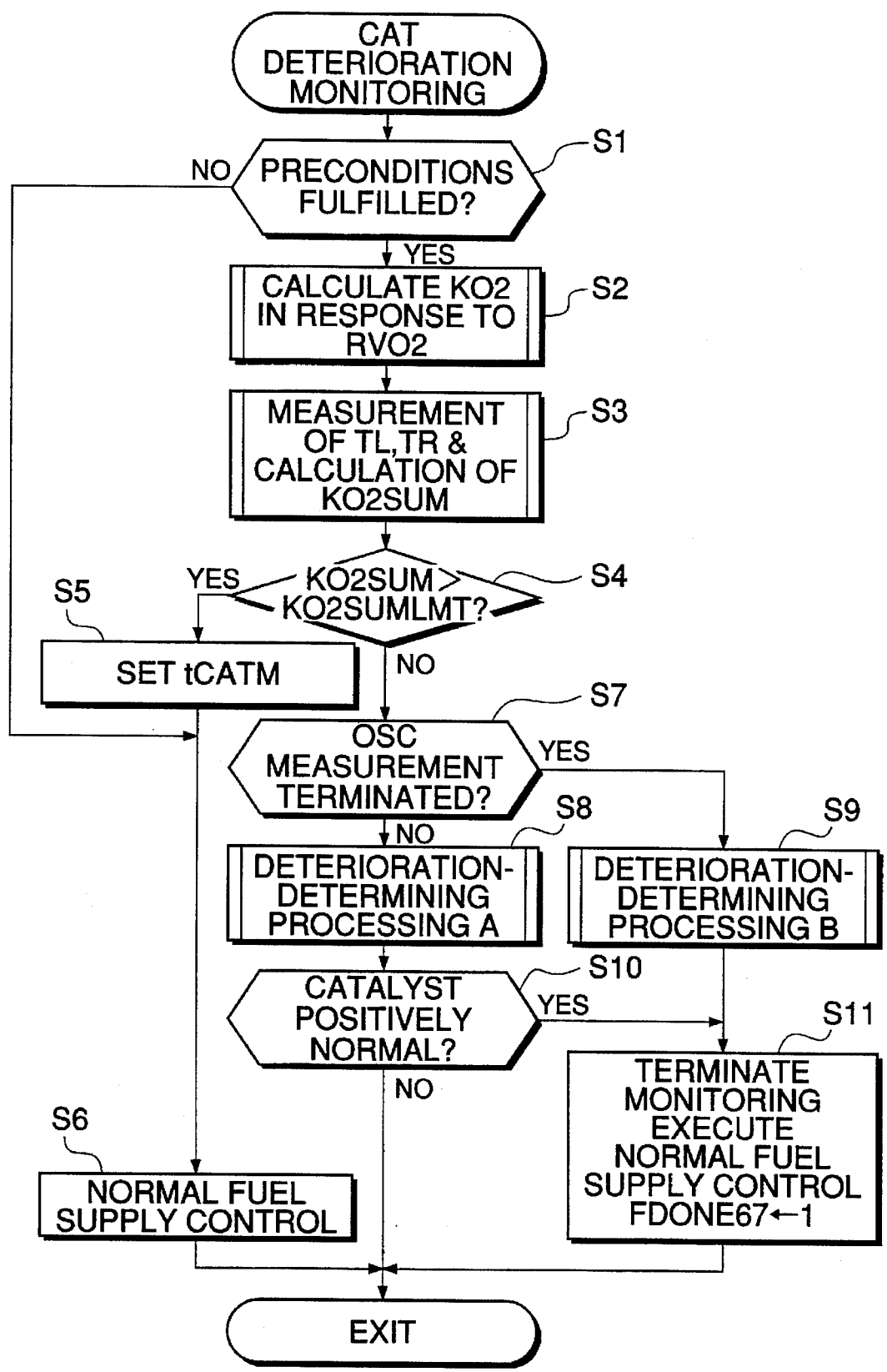
FIG. 2 is a flowchart showing a main routine for detecting deterioration of a catalyst appearing in FIG. 1.

An outline of the manner of detecting deterioration of the catalyst 14 will now be explained with reference to FIG. 2 showing a main program for carrying out the deterioration detection. This program is executed at regular time intervals (e.g. 5 msec).

First, at a step S1, it is determined whether or not preconditions (hereinafter referred to as "the monitoring preconditions") for carrying out the deterioration detection are fulfilled. If the monitoring preconditions are not fulfilled, the catalyst deterioration monitoring is not carried out but normal fuel supply control is carried out at a step S6, followed by terminating the program. On the other hand, if the answer to the question of the step S1 is affirmative (YES), that is, if the monitoring preconditions are fulfilled, the program proceeds to a step S2, wherein the value of the correction coefficient KO2 is calculated in response to the output RVO2 from the downstream O2 sensor 16. Then, at a step S3, the inversion time periods TL, TR are measured and a cumulative value KO2SUM of amounts of change in the correction coefficient KO2 is calculated, and it is determined at a step S4 whether or not the cumulative value KO2SUM is larger than a predetermined upper limit value KO2SUMLMT.

If the condition of KO2SUM>KO2SUMLMT is fulfilled at the step S4, the deterioration monitoring is not carried out but a down-counter timer tCATM is set to a predetermined time period TCAT (e.g. 5 sec.) and started at a step S5, followed by the program proceeding to a step S6. The down-counter timer tCATM is used in executing a subroutine for determining whether the monitoring preconditions are satisfied, which will be described hereinafter with reference to FIG. 3.

On the other hand, if the condition of KO2SUM≦KO2SUMLMT is fulfilled at the step S4, it is determined at a step S7 whether or not the measurement/calculation processing (OSC measurement) at the step S3 has been terminated. If the OSC measurement has not been terminated, a deterioration-determining processing A is executed at a step S8. In the deterioration-determining processing A, the catalyst is determined to be normal without executing a deterioration-determining processing B, described hereinafter, when a predetermined time period (e.g. 0.3 sec.) has elapsed from the time the output FVO2 from the upstream O2 sensor 15 was inverted across a predetermined reference voltage FVREF, with the output RVO2 from the downstream O2 sensor 16 remaining uninverted across the predetermined reference value RVREF. Then, it is determined at a step S10 whether or not the catalyst 14 has been determined to be normal by the deterioration-determining processing A. If the catalyst has been determined to be normal, the program proceeds to a step S11 to terminate the deterioration monitoring, and a flag FDONE67 is set to "1" to indicate the termination of the deterioration monitoring, followed by execution of the normal fuel supply control. If the answer to the question of the step S10 is negative (NO), the program is immediately terminated.

If it is determined at the step S7 that the OSC measurement has been terminated, the program proceeds to a step S9, wherein the deterioration-determining processing B is executed, and then the program proceeds to the step S11. The deterioration-determining processing B is for determining whether the catalyst is normal based on the inversion time periods TL, TR and the cumulative value KO2SUM.

Next, details of the steps S1 to S3, S8, and S9 will be described.

Figure 3:
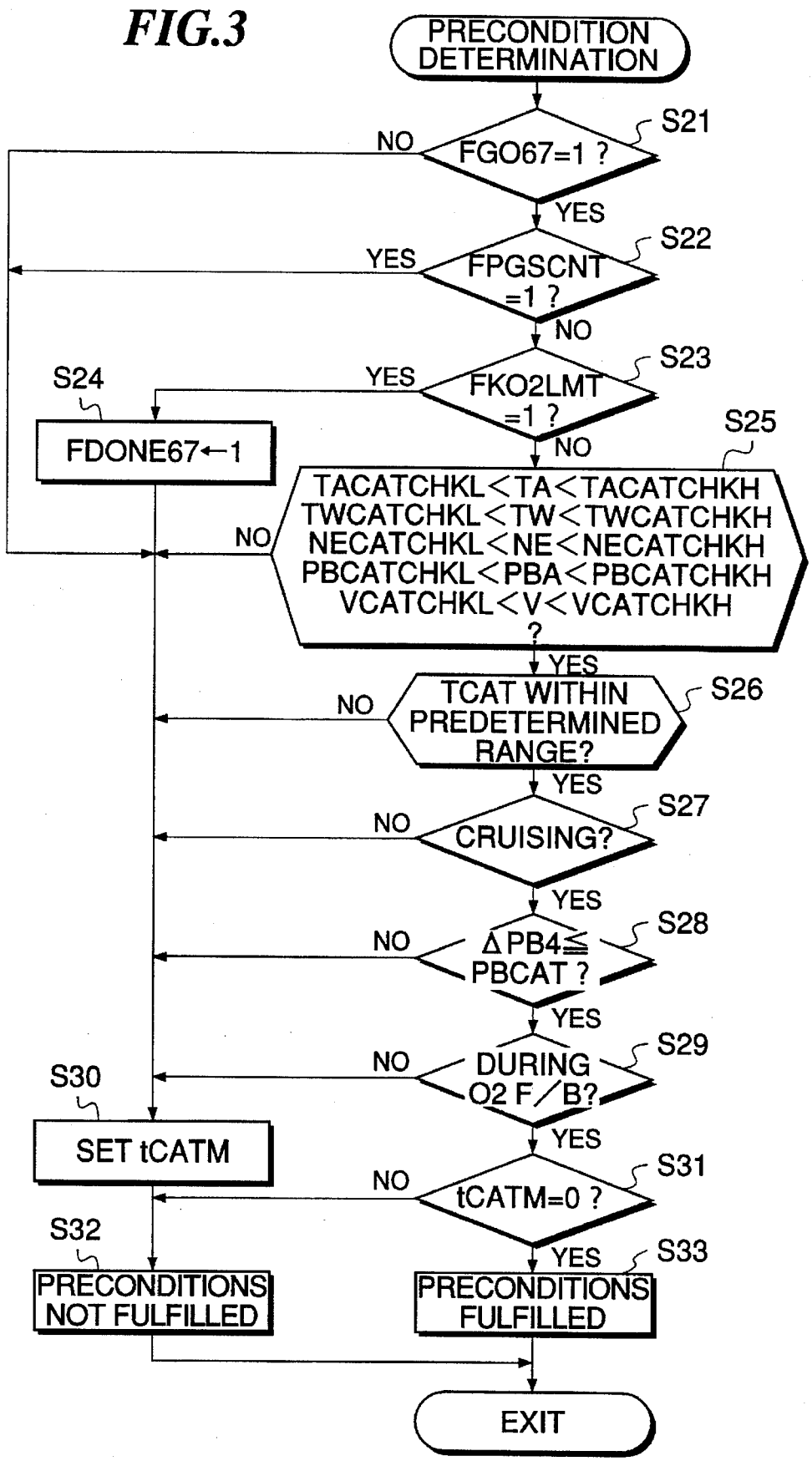
FIG. 3 is a flowchart showing a subroutine for determining whether or not preconditions for executing the detection of deterioration of the catalyst are fulfilled.

FIG. 3 shows details of the preconditions-determining step S1 in FIG. 2 for determining whether the monitoring preconditions are fulfilled.

First, it is determined at a step S21 whether or not a flag FGO67 assumes "1". The flag FGO67 is set to "0" e.g. during execution of monitorings other than the catalyst deterioration monitoring, such as an O2 sensor deterioration monitoring, an evaporative emission control system failure monitoring, and a fuel supply system abnormality monitoring, and to "1" when these monitorings other than the catalyst deterioration monitoring are not being executed. If the flag FGO67 assumes "0", which means that some other monitoring is being executed, the timer tCATM is set to the predetermined time period TCATM and started at a step S30, similarly to the step S5, and it is determined at a step S32 that the monitoring preconditions are not fulfilled.

If the flag FGO67 assumes "1" and hence the catalyst deterioration monitoring is permitted, it is determined at a step S22 whether or not a flag FPGSCNT has been set to "1" to indicate that the engine is in a condition in which purging of evaporative fuel from the canister into the intake pipe 2 should be inhibited. If FPGSCNT=1 and hence the purging of evaporative fuel should be inhibited, the program proceeds to the steps S30 and S32, determining that the monitoring conditions are not fulfilled. If FPGCNT=0 at the step S22, it is determined at a step S23 whether or not a flag FKO2LMT assumes "1". The flag FKO2LMT is set to "1" when the correction coefficient KO2 has been held at a predetermined upper or lower limit value over a predetermined time period (in a held-to-KO2 limit state).

If FKO2LMT=1 and hence the correction coefficient KO2 is in the held-to-KO2 limit state, the flag FDONE67 is set to 1 at a step S24, followed by the program proceeding to the step S30.

If FKO2LMT=0 and hence the correction coefficient KO2 is not in the held-to-KO2 limit state, it is further determined at a step S25 whether or not the intake air temperature TA is within a range defined by a predetermined lower limit value TACATCHKL (e.g. −0.2° C.) and a predetermined higher limit value TACATCHKH (e.g. 100° C.), whether the engine coolant temperature TW is within a range defined by a predetermined lower limit value TWCATCHKL (e.g. 80° C.) and a predetermined upper limit value TWCATCHKH (e.g. 100° C.), whether or not the engine rotational speed NE is within a range defined by a predetermined lower limit value NECATCHKL (e.g. 2800 rpm) and a predetermined upper limit value NECATCHKH (e.g. 3200 rpm), whether or not the intake pipe absolute pressure PBA is within a range defined by a predetermined lower limit value PBCATCHKL (e.g. 410 mmHg) and a predetermined upper limit value PBCATCHKH (e.g. 510 mmHg), and whether or not the vehicle speed VH is within a range defined by a predetermined lower limit value VHCATCHKL (e.g. 32 km/h) and a predetermined upper limit value VHCATCHKH (e.g. 80 km/h). If these engine operating parameters are all within the above ranges, respectively, it is further determined at a step S26 whether or not the catalyst temperature TCAT is within a predetermined range (of e.g. 350° C. to 800° C.). In the present embodiment, the catalyst temperature TCAT is detected by the catalyst temperature sensor 13, but there may be used a temperature value estimated from engine operating parameters, instead.

Further, if the catalyst temperature TCAT is within the predetermined range, it is further determined at a step S27 whether or not the vehicle is cruising. This determination is carried out e.g. by determining whether or not the variation in the vehicle speed VH has continually been below 0.8 km/h per sec. over a predetermined time period (e.g. 2 seconds). If the vehicle is cruising, it is determined at a step S28 whether or not the intake pipe absolute pressure PBA has an amount of variation $\Delta PB4$ (e.g. over 5 msec.) which is below a predetermined value PBCAT (e.g. 16 mmHg). If the amount of variation $\Delta PB4$ is below the predetermined value PBCAT, it is further determined at a step S29 whether or the air-fuel ratio feedback control responsive to the output FVO2 from the upstream O2 sensor 15 is being executed.

If any of the answers to the questions of the steps S25 to S29 is negative (NO), the program proceeds to the step S30, whereas if all the answers are affirmative (YES), i.e. if the engine is in a predetermined condition for carrying out the catalyst monitoring, it is determined at a step S32 whether or not the count of the down-counter timer tCATM is equal to "0". When this question is first made, the condition of tCATM>0 holds, and hence the monitoring preconditions are not determined to be fulfilled (at the step S32). The monitoring preconditions are fulfilled only after the engine has been in the above-described predetermined condition for the predetermined time period TCATM (e.g. 5 seconds).

Figure 4:
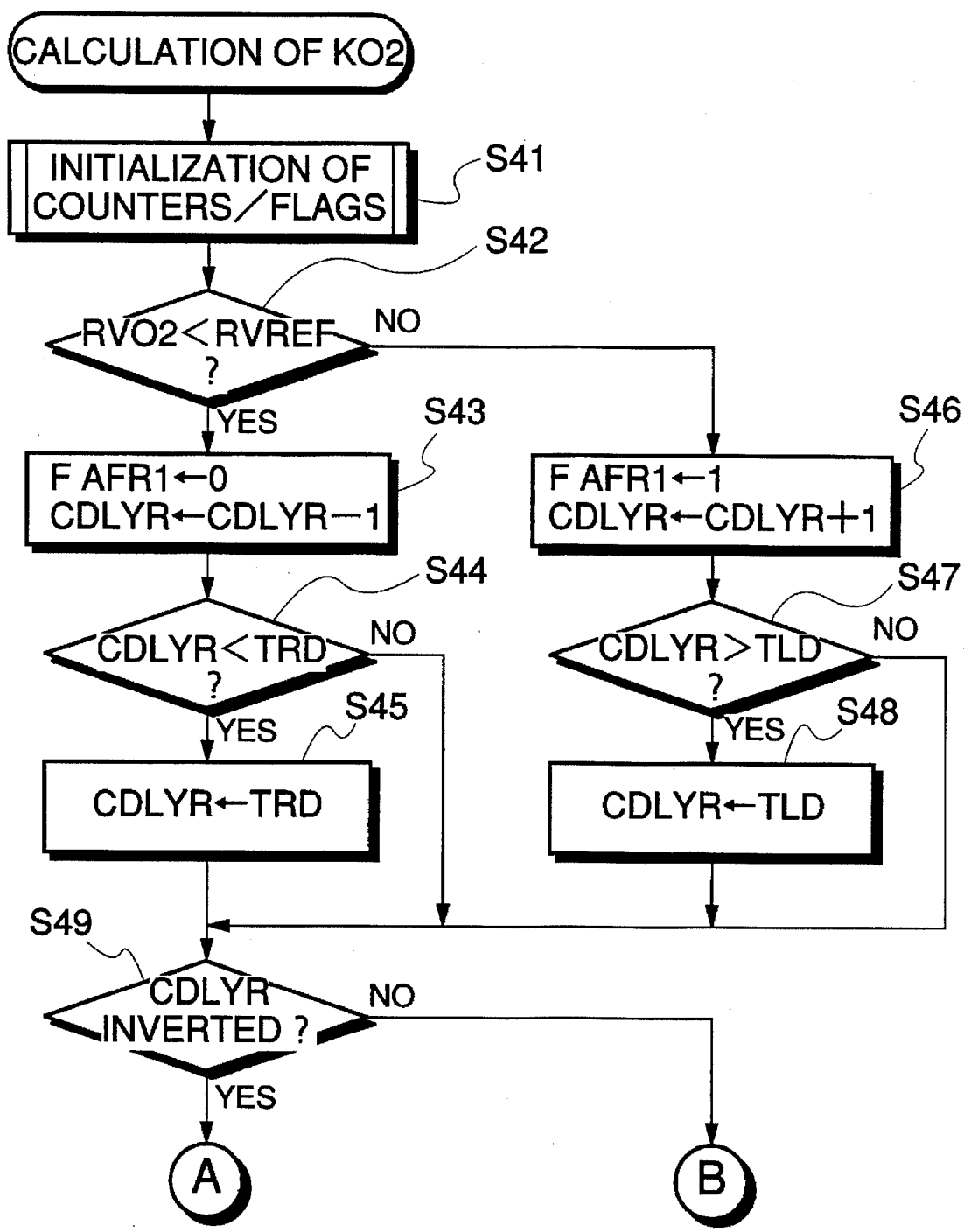
FIG. 4 is a flowchart showing a subroutine for calculation of an air-fuel ratio correction coefficient KO2 executed at a step in FIG. 2.
Figure 5:
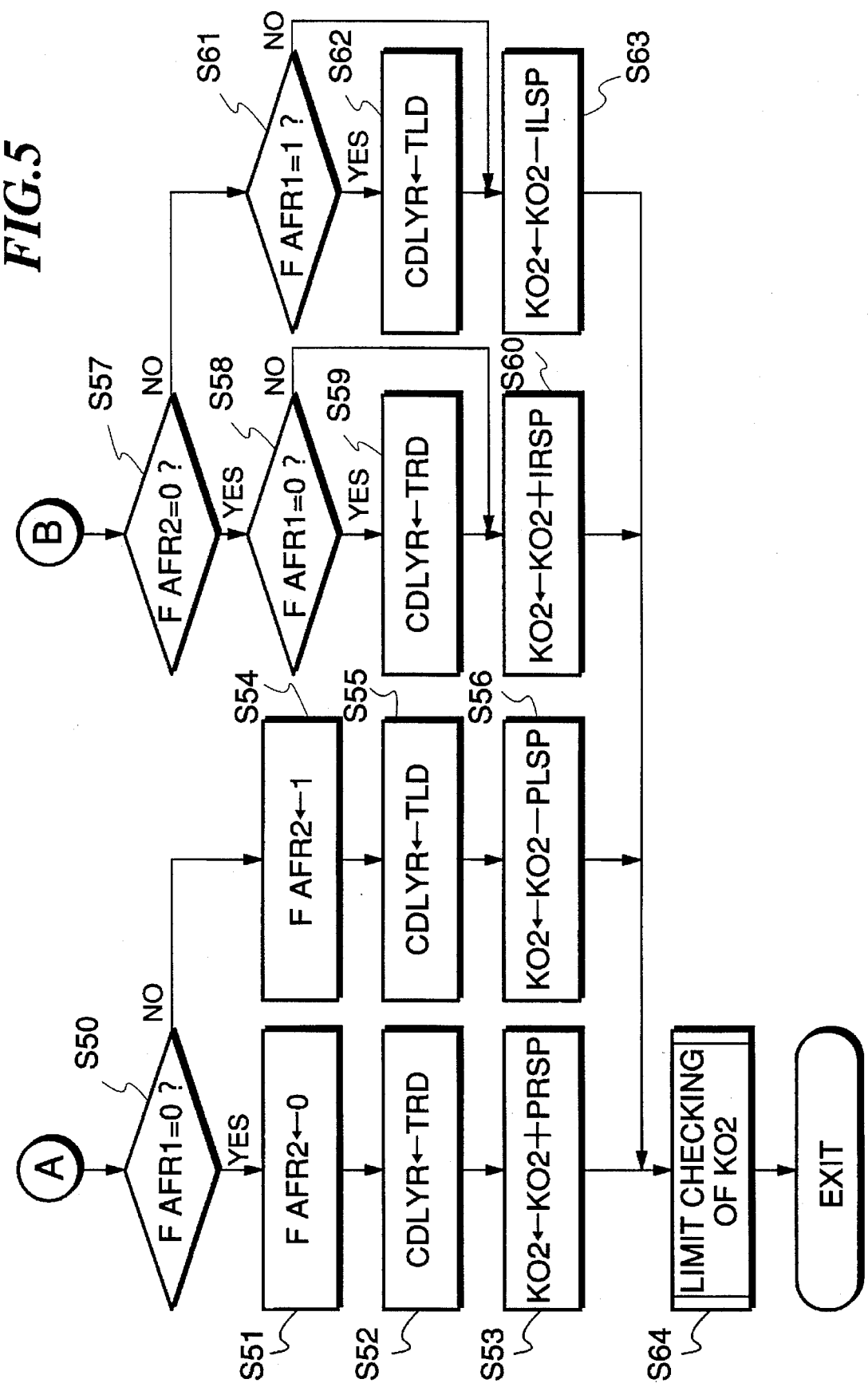
FIG. 5 is a flowchart showing a continued part of the program of FIG. 4.

FIGS. 4 and 5 show details of the subroutine for calculating the value of the correction coefficient KO2 executed at the step S2 in FIG. 2.

First, counters and flags used in the present processing and other processings described later are initialized. This initializing processing is executed by a subroutine shown in FIG. 6.

Figure 6:
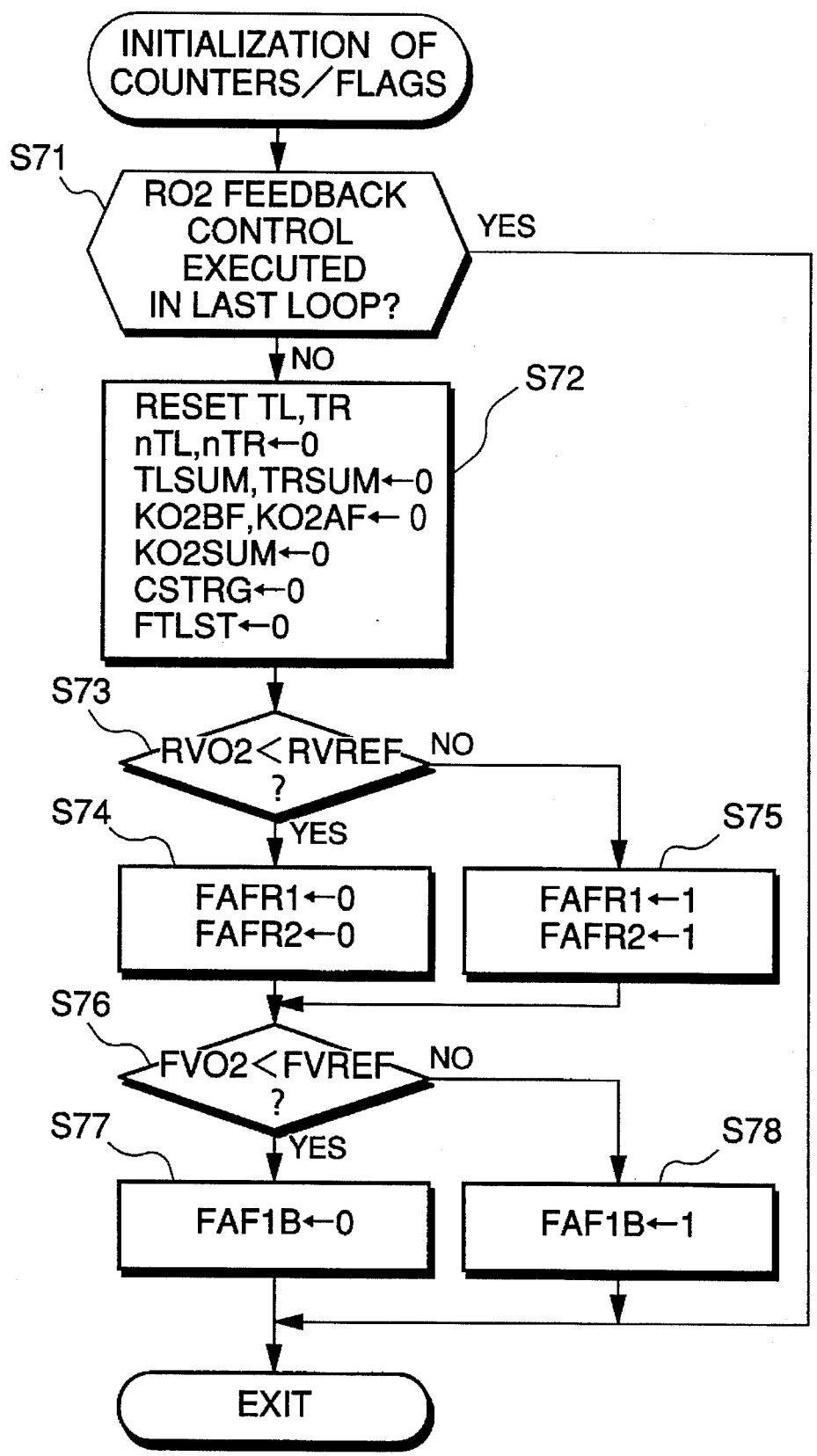
FIG. 6 is a flowchart showing a subroutine for initializing counters and flags used in the detection of deterioration of the catalyst.

In FIG. 6, it is determined at a step S71 whether or not the feedback control responsive to the output RVO2 from the downstream O2 sensor 16 was carried out in the immediately preceding loop. If the answer to this question is affirmative (YES), the present processing is immediately terminated since the initialization has been completed. When the feedback control is started first in the present loop, the program proceeds to a step S72, wherein the inversion time periods TL, TR are reset (set to "0"), and numbers nTL, nTR of measurement of the inversion time periods TL, TR, cumulative values TLSUM, TRSUM of the inversion time periods TL, TR, the immediately preceding value KO2BF and the present value KO2AF (hereinafter referred to as "the immediately-after-PLSP value") of the correction coefficient KO2 calculated immediately after a special P term PLSP (lean-skipping amount) has been generated, the cumulative value KO2SUM of amounts of change in the correction coefficient KO2, a quick OK-determining counter CSTRG used in the deterioration-determining processing A, and a TL measurement flag FTLST, which is set to "1" to indicate that the measurement of the inversion time period TL has started, are all set to "0".

Figure 7:
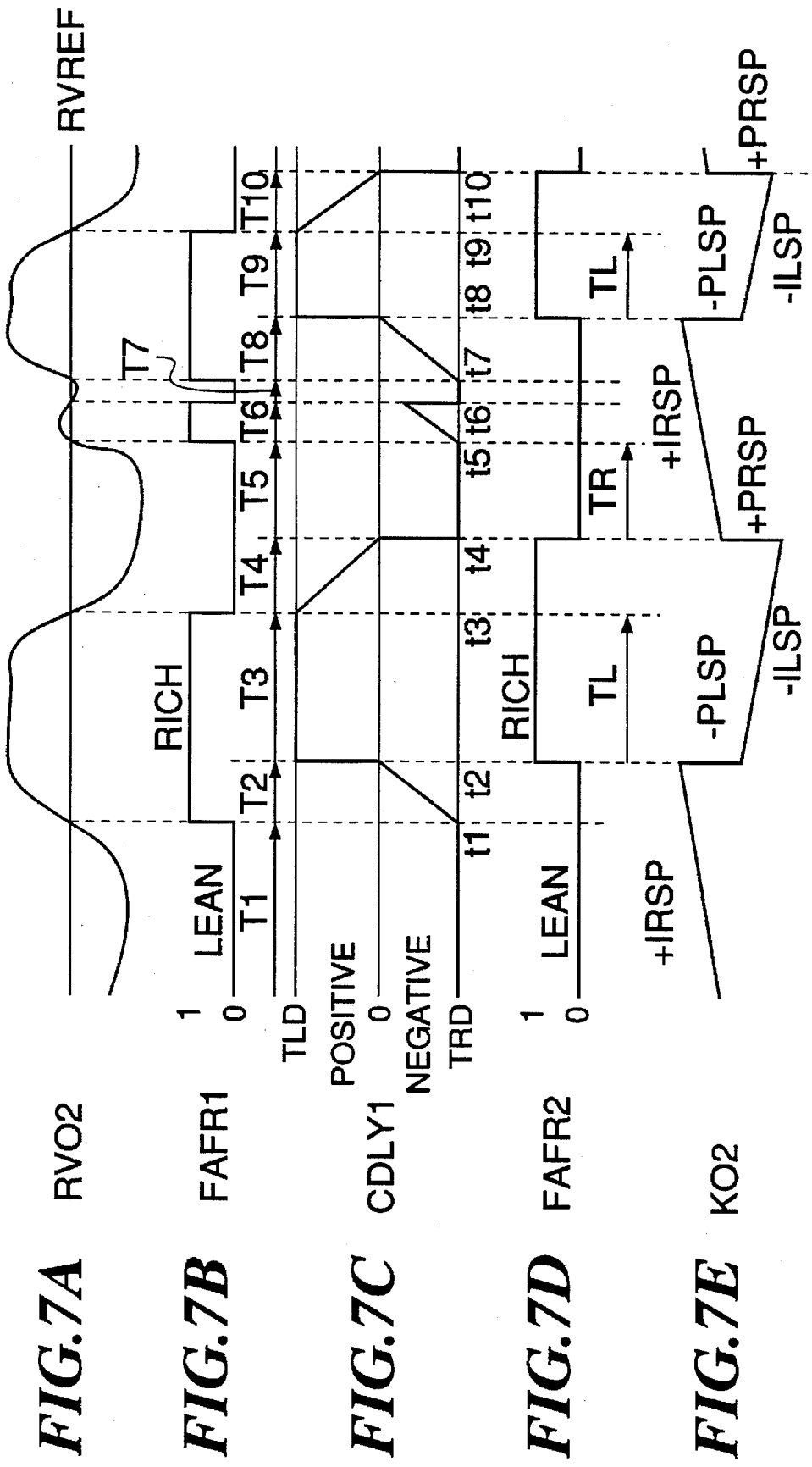
FIGS. 7A to 7E collectively form a timing chart which is useful in explaining a manner of calculation of the air-fuel ratio correction coefficient KO2.

Then, it is determined at a step S73 whether or not the output RVO2 from the downstream O2 sensor 16 is smaller than a downstream reference value RVREF (e.g. 0.45 V). If RVO2<RVREF, first and second downstream rich flags FAFR1 and FAFR2 are both set to "0" at a step S74, whereas if RVO2≧RVREF, the first and second downstream rich flags FAFR1, FAFR2 are both set to "1" at a step S75. The first downstream rich flag (hereinafter simply referred to as "the first flag") FAFR1 is set to "1" when the output RVO2 from the downstream O2 sensor 16 is higher than the predetermined reference value RVREF, i.e. on a richer side, as shown in FIGS. 7A and 7B, while the second downstream rich flag (hereinafter simply referred to as "the second flag") FAFR2 is set to the same value as the first flag FAFR1 after delay of a predetermined time period from a time point the first flag FAFR1 has been inverted.

At the following step S76, it is determined whether or not the output FVO2 from the upstream O2 sensor 15 is smaller than the predetermined reference voltage FVREF (e.g. 0.45 V). If FVO2<FVREF, an upstream rich-in-last-loop flag FAF1B is set to "0" at a step S77, whereas if RVO2≧RVREF, the upstream rich-in-last-loop flag FAFB1 is set to "1" at a step S78. The upstream rich-in-last-loop flag FAFB1 is set to "1" when the condition of FVO2>FVREF was fulfilled when the present program was executed in the immediately preceding loop.

Referring again to FIG. 4, at a step S42, it is determined whether or not the output RVO2 from the downstream O2 sensor is smaller than the predetermined reference voltage RVREF. If the answer to this question is affirmative (YES), i.e. if the air-fuel ratio of the mixture supplied to the engine is lean (as at T1, T4, T5, T7, T10 in FIG. 7B), the first flag FAFR1 is set to 0 and at the same time a value of 1 is subtracted from a count CDLYR of the counter CDLYR which is used to cause a delay in generation of the special P term, at a step S43. Then, it is determined at a step S44 whether or not the count CDLYR indicates a time period shorter than a delay time period TRD (<0, set e.g. to −40 msec.) for causing a delay in generation of the special P term PLSP (lean-skipping amount). If the answer is negative (NO), the program jumps to a step S49, whereas if the answer is affirmative (YES), the count CDLYR is set to a value corresponding to the delay time period TRD (<0), at a step S45, and then the program proceeds to the step S49.

If the answer to the question of the step S42 is negative (NO), that is, if the air-fuel ratio of the mixture is rich (as at T2, T3, T6, TS, T9 in FIG. 7B), the first flag FAFR1 is set to "1", and "1" is added to the count CDLYR at a step S46. Then, it is determined at step S47 whether or not the count CDLYR indicates a time period longer than a delay time period TLD (>0, set e.g. to 40 msec.) for causing a delay in generation of the special P term PRSP (rich-skipping amount). If the answer is negative (NO), the program jumps to the step S49, whereas if the answer is affirmative (YES), the count CDLYR is set to a value corresponding to the delay time period TLD (>0), and then the program proceeds to the step S49.

At the step S49, it is determined whether or not the count CDLYR has been inverted from a positive value to a negative value or vice versa. If it has been inverted (as at t2, t4, t8, t10 in FIG. 7C), it is determined at a step S50 whether or not the first flag FAFR1 assumes "0".

If the answer to the question of the step S50 is affirmative (YES), that is, if the air-fuel ratio of the mixture indicated by the output RVO2 after the inversion of the count CDLYR is lean (as at t4, t10 in FIG. 7C), the second flag FAFR2 is set to "0" at a step S51, the count CDLYR is set to a value corresponding to the delay time period TRD at a step S52, and proportional term control is effected wherein the special P term PRSP (e.g. 0.068) is added to an immediately preceding value of the correction coefficient KO2 at a step S53.

If the answer to the question of the step S50 is negative (NO), that is, if the air-fuel ratio indicated by the output RVO2 after the inversion of the count CDLYR is rich (as at t2, t8 in FIG. 7C), the second flag FAFR2 is set to "1" at a step S54, the count CDLYR is set to a value corresponding to the delay time period TLD at a step S55, and proportional term control is effected wherein the special P term PLSP is subtracted from the immediately preceding value of the correction coefficient KO2 at a step S56.

If the answer to the question of the step S49 is negative (NO), that is, if there has been no inversion in the count CDLYR, it is determined at a step S57 whether or not the second flag FAFR2 assumes "0". If the flag FAFR2 assumes "0". it is determined at a step S58 whether or not the first flag FAFR1 assumes "0". If the answer is negative (NO), that is, if the flag FAFR1 assumes "1" and at the same time the flag FAFR2 assumes "0" (as at T2, T6, TS, in FIG. 7B), the program jumps to a step S60, wherein integral term control is effected to add the special I term IRSP (e.g. 0.000091) to the immediately preceding value of the correction coefficient KO2. On the other hand, if the answer to the question of the step S58 is affirmative (YES), that is, if the flags FAFR1, FAFR2 both assume "0" (as at T1, T5, T7 in FIG. 7B), the count CDLYR is set to a value corresponding to the delay time period TRD at a step S59, and then the program proceeds to the step S60.

If the answer to the question of the step S57 is negative (NO), it is determined at a step S61 whether or not the first flag FAFR1 assumes "1". If the answer is negative (NO), that is, if the flag FAFR1 assumes "0" and at the same time the flag FAFR2 assumes "1" (as at T4, T10 in FIG. 7B), the program lumps to a step S63, wherein integral term control is effected to subtract the special I term ILSP (e.g. 0.000091) from the immediately preceding value of the correction value KO2. On the other hand, if the answer to the question of the step S61 is affirmative (YES), that is, if the flags FAFR1 FAFR2 both assume "1" (as at T3, T9 in FIG. 7B), the count CDLYR is set to a value corresponding to the delay time period TLD at a step S62, and then the program proceeds to the step S63.

After the calculation of the correction coefficient KO2 has been made at the step S53, S56, S60 or S63, limit checking of the calculated value of the correction coefficient KO2 is carried out at a step S64, followed by terminating the program.

According to the routine of FIGS. 4 and 5 described above, the proportional term control is effected (at t2, t4, t8, t10) after delay of a predetermined time period (T2, T4, T8, T10) from each time point (t1, t3, t7, t9) of inversion of the output RVPO2 from the downstream O2 sensor 16. So long as the second flag FAFR2 assumes "0", the integral term control is executed in a KO2 value-increasing direction (during T1, T2, T5 to T8), whereas so long as the second flag FAFR2 assumes "1", the integral term control is executed in a KO2 value-decreasing direction (during T3, T4, T9 to T10). It should be noted that the output RVO2 fluctuates with short inversion periods from the time point t5 to the time point t7, but the second flag FAFR2 is not inverted since these inversion periods are shorter than the delay time period TRD for delaying the proportional term control, and hence the proportional term control is not carried out.

Figure 8:
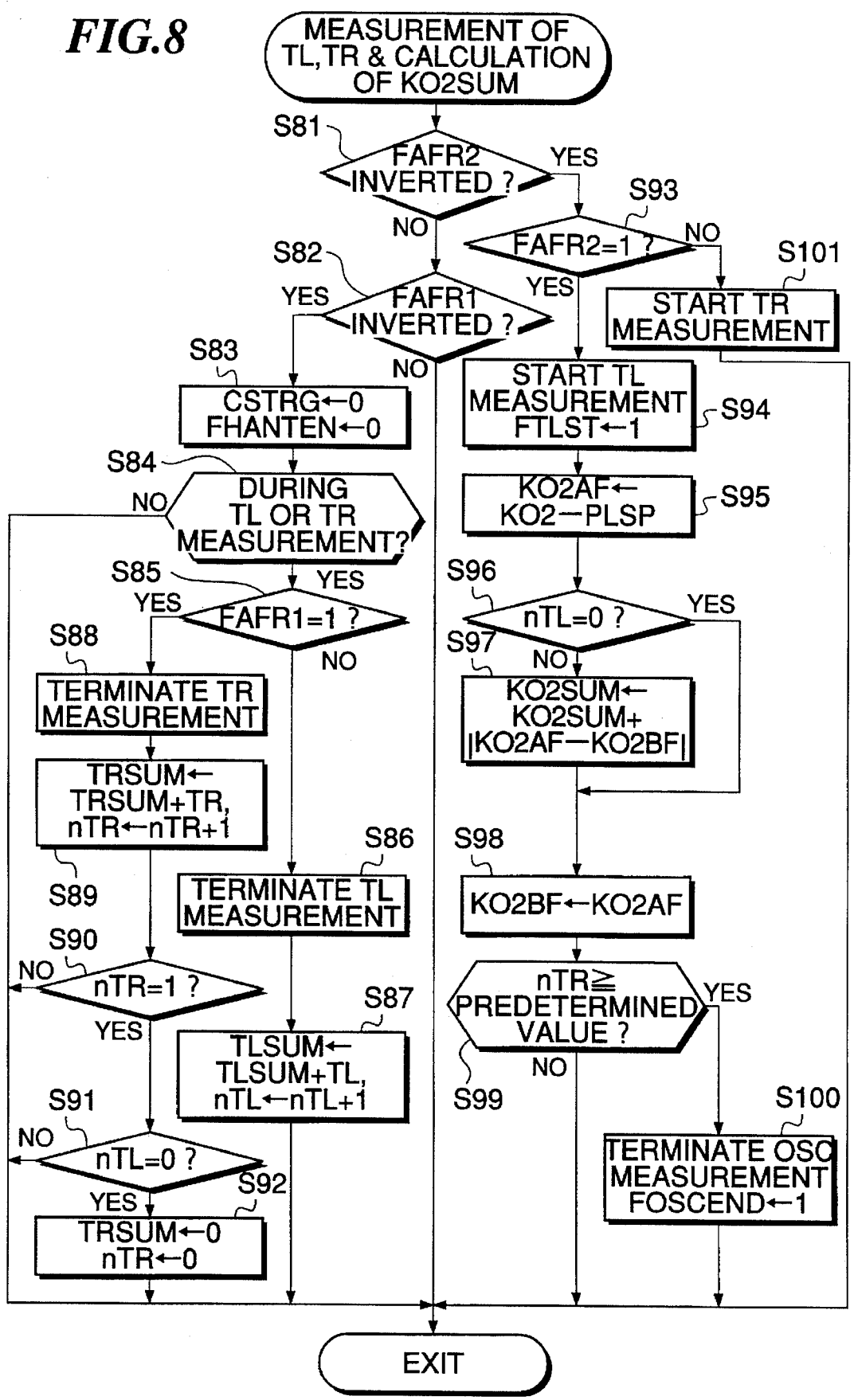
FIG. 8 is a flowchart showing a subroutine for calculating inversion time periods (TR, TL) and a cumulative value (KO2SUM) of amounts of change in the air-fuel ratio correction coefficient KO2.

FIG. 8 shows a subroutine executed at the step S3 in FIG. 2 for measuring the inversion time periods TL, TR and calculating the cumulative value KO2SUM.

At a step S81, it is determined whether or not the second flag FAFR2 has been inverted. If the second flag FAFR2 has been inverted, it is determined at a step S93 whether or not the second flag FAFR2 assumes "1". If FAFR2=0 (as at t4 in FIG. 7D), the measurement of the inversion time period TR is started at a step S101, followed by terminating the program. If FAFR2=1 (as at t2, t8 in FIG. 7D), the measurement of the inversion time period TL is started and a TL measurement flag FTLST is set to "1" at a step S94. Then, the present value KO2AF of the immediately-after-PLSP value is calculated at a step S95 by the use of the following equation (2):

$$KO2AF = KO2 - PLSP \tag{2}$$

At the following step S96, it is determined whether or not the TL measurement time number nTL, which is a total number of times of measurement of the inversion time period TL, is equal to "0", i.e. whether or not the TL measurement is carried out for the first time. If this is the first measurement of the inversion time period TL, the program jumps to a step S98, whereas if it is a second or later measurement of the same, the cumulative value KO2SUM is calculated by the use of the following equation KO2SUM, followed by the program proceeding to the step S98:

$$KO2SUM = KO2SUM + |KO2AF - KO2BF| \tag{3}$$

where KO2SUM on the right side represents the immediately preceding value of the cumulative value KO2SUM, and KO2BF represents the immediately preceding value of the immediately-after-PLSP value.

By the above equation (3), the cumulative value KO2SUM is calculated as the cumulative value of amounts of change in the KO2 calculated immediately after the special P term PLSP is generated.

Then, at the step S98, the present value of KO2AF of the immediately-after-PLSP value is set to the immediately preceding value KO2BF thereof, and then it is determined at a step S99 whether or not the TR measurement time number nTR, which is a total number of times of measurement of the inversion time period TR, is equal to a predetermined value. If the TR measurement time number nTR has not reached the predetermined value, the present program is immediately terminated, whereas if the former has reached the latter, a measurement termination flag FOSCEND is set to "1" at a step S100 to indicated that the OSC measurement has been terminated, followed by terminating the program.

If it is determined at the step S81 that the second flag FAFR2 has not been inverted, it is determined at a step S82 whether or not the first flag FAFR1 has been inverted. If neither of the flags has been inverted, the present program is immediately terminated.

If the second flag FAFR2 has not been inverted but the first flag FAFR1 alone has been inverted, the program proceeds to a step S83, where the quick OK determination counter CSTRG for use in the deterioration-determining processing A described below with reference to FIG. 9 and an inversion flag FHANTEN are set to "0", and then it is determined at a step S84 whether or not the measurement of the inversion time period TL or TR is being carried out. If the measurement is not being carried out, the present program is immediately terminated, while if the measurement is being carried out, it is determined at a step S85 whether or not the first flag FAFR1 assumes "1".

If FAFR1=0 (as at t3, t9 in FIG. 7B), the measurement of the inversion time period TL is terminated at a step S86, and the cumulative value TLSUM of the inversion time period TL is calculated by the use of the following equation (4):

$$TLSUM = TLSUM + TL \tag{4}$$

and the TL measurement time number nTL is incremented by 1 at a step S87, followed by terminating the program.

Further, if FAFR1=1 at the step S85 (as at t5 in FIG. 7B), the measurement of the inversion time period TR is terminated at a step S88, and the cumulative value TRSUM of the inversion time period TR is calculated by the use of the following equation (5):

$$TRSUM = TRSUM + TR \tag{5}$$

and the TR measurement time number nTR is incremented by 1 at a step S89.

Then, it is determined at a step S90 whether or not the TR measurement time number nTR is equal to 1, and if nTR=1, it is further determined at a step S91 whether the TL measurement time number nTL is equal to "0". If nTR≠1 or nTL≠0, the present program is immediately terminated, while if nTR=1 and at the same time nTL=0, the cumulative value TRSUM and the TR measurement time number nTR are both set to "0" at a step S92, followed by terminating the program.

The steps S90 to S92 are provided to reset the cumulative value TRSUM and the TR measuring time number nTR when the measurement of the inversion time period TR has started earlier than that of the inversion time period TL, since the measurement of the inversion time period TL is required to be started earlier in the present embodiment.

By the FIG. 8 processing, the cumulative values TLSUM, TRSUM of the inversion time periods TL, TR appearing in FIG. 7D and the cumulative value KO2SUM of amounts of change |KO2AF−KO2BF| in the immediately-after-PLSP value of the correction coefficient KO2 are calculated.

Figure 9:
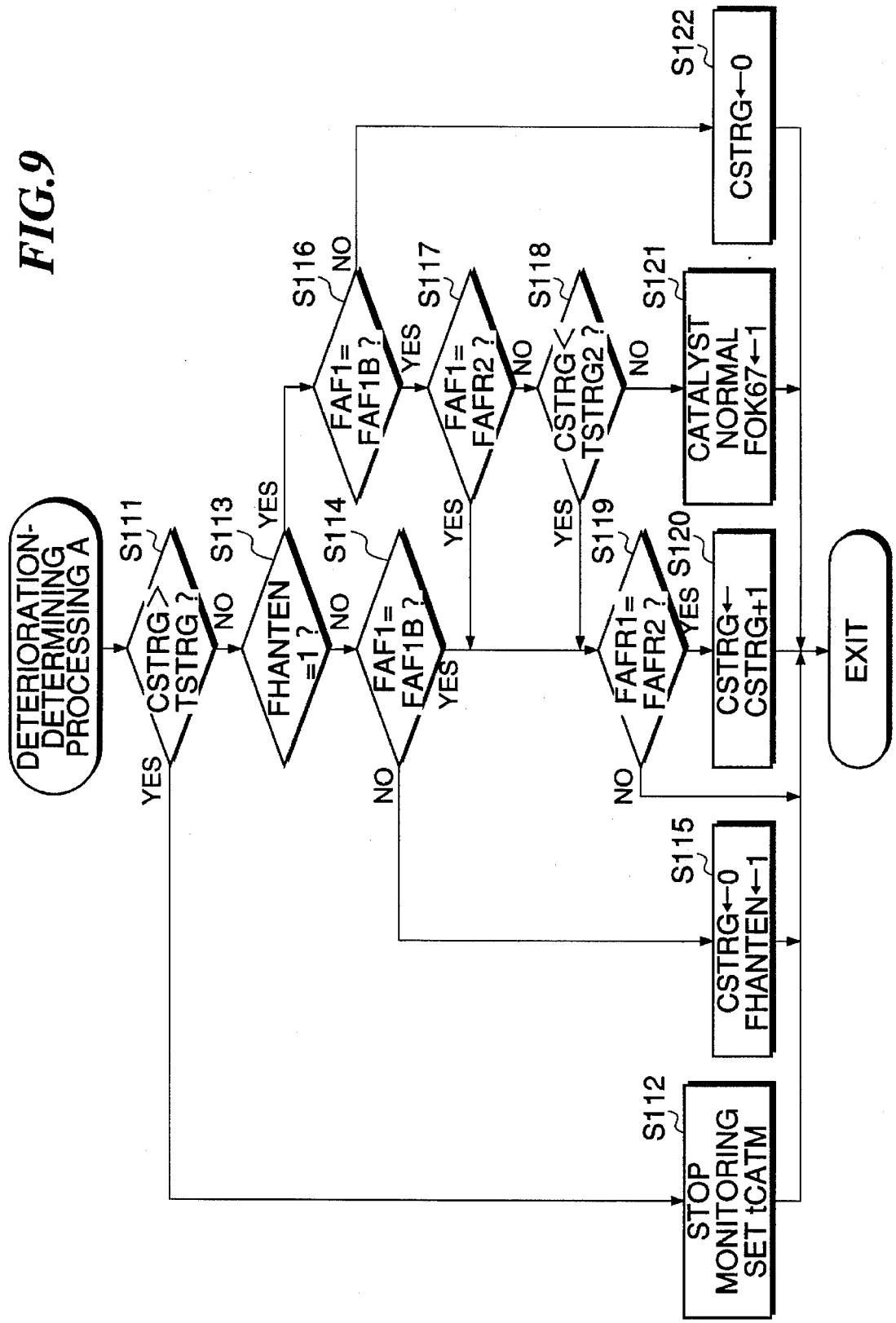
FIG. 9 is a flowchart showing a subroutine for a deterioration-determining processing A.

FIG. 9 shows a subroutine for the deterioration-determining processing A, which is executed at the step S8 of FIG. 2.

First, at a step S111, it is determined whether or not the count of the quick OK determination counter CSTRG is larger than a first predetermined value TSTRG (corresponding to e.g. 4 seconds). If CSTRG≦TSTRG, it is determined at a step S113 whether or not the inversion flag FHANTEN assumes "1". When this question is first made, FHANTEN=0 (see the step S83 in FIG. 8), so that the program proceeds to a step S114, wherein it is determined whether or not an upstream rich flag FAF1, which is set to "1" when the output FVO2 from the upstream O2 sensor 15 is higher than the predetermined reference voltage FVREF for the upstream O2 sensor (i.e. on a richer side), assumes the same value as the upstream rich-in-last-loop flag FAF1B. If FAF1=FAF1B, which means that the upstream rich flag FAF1 has not been inverted, the program proceeds to a step S119, wherein it is further determined whether or not the first and second downstream rich flags FAFR1 and FAFR2 assume the same value. If they do not assume the same value, the present processing is immediately terminated, whereas if they assume the same value, the quick OK determination counter CSTRG is incremented by 1 at a step S120, followed by terminating the program. By execution of the step S120, the count of the counter CSTRG increases as shown in FIG. 10F.

If FAF1≠FAF1B at the step S114, which means that the upstream rich flag FAF1 has been inverted, the program proceeds to a step S115, where the counter CSTRG is reset, and at the same time the inversion flag FHANTEN is set to "1", followed by terminating the program.

If the inversion flag FHANTEN is set to "1" at the step S115, the answer to the question of the step S113 in the next loop becomes affirmative (YES), and hence the program proceeds to a step S116, wherein it is determined whether or not the upstream rich flag FAF1 assumes the same value as the upstream rich-in-last-loop flag FAF1B. If FAF1=FAF1B, which means that the upstream rich flag FAF1 has not been inverted, the program proceeds to a step S117, wherein it is further determined whether or not the first and second flags FAFR1 and FAFR2 assume the same value. If FAFR1≠FAFR2, the program proceeds from the step S117 to a step S118, wherein it is determined whether or not the count of the counter CSTRG is smaller than a second predetermined value TSTRG2 (corresponding to e.g. 0.3 seconds).

If the answer to the question of the step S117 or S118 is affirmative (YES), the program proceeds to the step S119, whereas if the upstream rich flag FAF1 is inverted before the count of the counter CSTRG reaches the second predetermined value TSTRG2, the answer to the question of the step S116 becomes negative (NO), and the program proceeds to a step S122, wherein the counter CSTRG is reset.

Further, if it is determined at the step S118 that the count of the counter CSTRG reaches the second predetermined value TSGRG, the program proceeds to a step S121, wherein it is determined that the catalyst 14 is not deteriorated, and a normal determination flag FOK67 is set to "1" to indicate the normal status of the catalyst 14, followed by terminating the present processing.

If CSTRG>TSTRG at the step S111, the deterioration monitoring is inhibited, and the preconditions-determining timer tCATM is set to the predetermined time period TCATM and started at a step S112, followed by terminating the program.

Next, details of the deterioration-determining processing A shown in FIG. 9 will be described with reference to FIG. 10.

Figure 10:
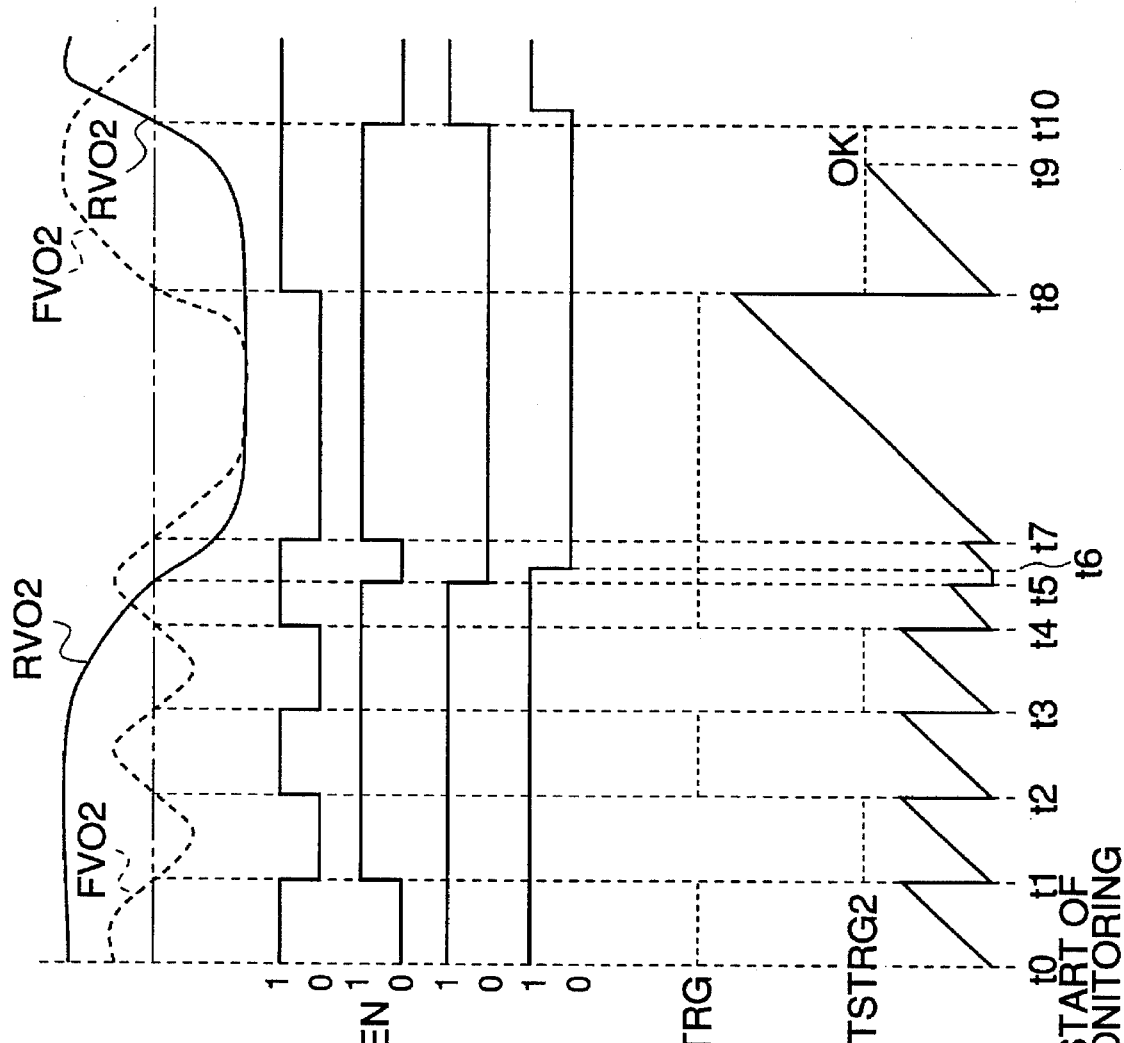
FIGS. 10A to 10F collectively form a timing chart which is useful in explaining the deterioration-determining processing A.

Let it be assumed as shown in FIG. 10 that at a time point t0 the monitoring is started, both the outputs FVO2 and RVO2 from the upstream and downstream O2 sensors are on the richer side, and the inversion flag FHANTEN assumes "0". At a time point t1, the output FVO2 from the upstream O2 sensor 15 is inverted, and the inversion flag FHANTEN is changed from "0" to "1". Thereafter, the inversion flag FHANTEN continues to assume "1" up to a time point t5, during which the counter CSTRG is reset (at time points t2, t3, t4) whenever the upstream O2 sensor FVO2 is inverted.

At the time point t5, the output RVO2 from the downstream O2 sensor is inverted, so that the inversion flag FHANTEN is changed from "1" to "0" and at the same time the counter CSTRG is reset (at the step S83 in FIG. 8). From the time point t5 to a time point t6, FAFR1≠FAFR2, so that the counter CSTRG does not count up (at the step S119).

When the output FVO2 from the upstream O2 sensor is inverted at a time point t7, the inversion flag FHANTEN is changed from "0" to "1". At this time point, the upstream rich flag FAF1 and the second downstream rich flag FAFR2 assume the same value, so that the program proceeds from the step S117 to the step S119, without executing the step S118. Accordingly, the counter CSTRG continues to count up so long as the count thereof does not exceed the first predetermined value TSTRG. Then, at a time point t8, the output FVO2 from the upstream O2 sensor 15 is inverted, so that the counter CSTRG is reset. After the time point t8, FAF1≠FAFR2 holds, so that the program proceeds from the step S117 to the step S118. The count of the counter CSTRG reaches the second predetermined value TSTRG at a time point t9, whereupon it is determined that the catalyst is normal. This manner of determination is called "the quick OK determination method". It should be noted that if the normal determination flag FOK67 is set to "1", the answer to the question of the step S10 in FIG. 2 becomes affirmative (YES), so that the deterioration monitoring is immediately terminated.

As described above, according to the FIG. 9 processing, if the output RVO2 from the downstream O2 sensor 16 is not inverted within the second predetermined time period TSTRG2 after inversion of the output FVO2 from the upstream O2 sensor 15, i.e. if a difference in phase between an inversion of the output FVO2 from the upstream O2 sensor 15 and an inversion of the output RVO2 from the downstream O2 sensor 16 is equal to or larger than a predetermined amount corresponding to the second predetermined time period TSTRG2, it is determined that the storage capacity of the catalyst 14 is sufficiently large, and hence it is determined that the catalyst is normal, followed by terminating the deterioration monitoring. The "difference in phase" means a time period during which the output FVO2 from the upstream O2 sensor is on one side with respect to the reference voltage FVREF (i.e. lean or rich), but the output RVO2 from the downstream O2 sensor is on the other side with respect to the reference voltage RVREF (i.e. rich or lean). In the present embodiment, FVREF=RVREF. This manner of determination enables quick determination of normality of the catalyst 14. Further, if the air-fuel ratio of the mixture supplied to the engine continues to be rich due to purging of evaporative fuel during deceleration of the engine, the output FVO2 from the upstream O2 sensor and the output RVO2 from the downstream O2 sensor RVO2 both continue to be rich (higher than the respective predetermined reference voltages FVREF, RVREF), which ensures inhibition of an erroneous determination that the catalyst is normal, in such a case.

When the output FVO2 from the upstream O2 sensor is inverted at relatively small time intervals (from t0 to t7 in FIG. 10A), the counter CSTRG is reset even if the output RVO2 from the downstream O2 sensor is not inverted, which prevents a quick OK determination from being made.

Figure 11:
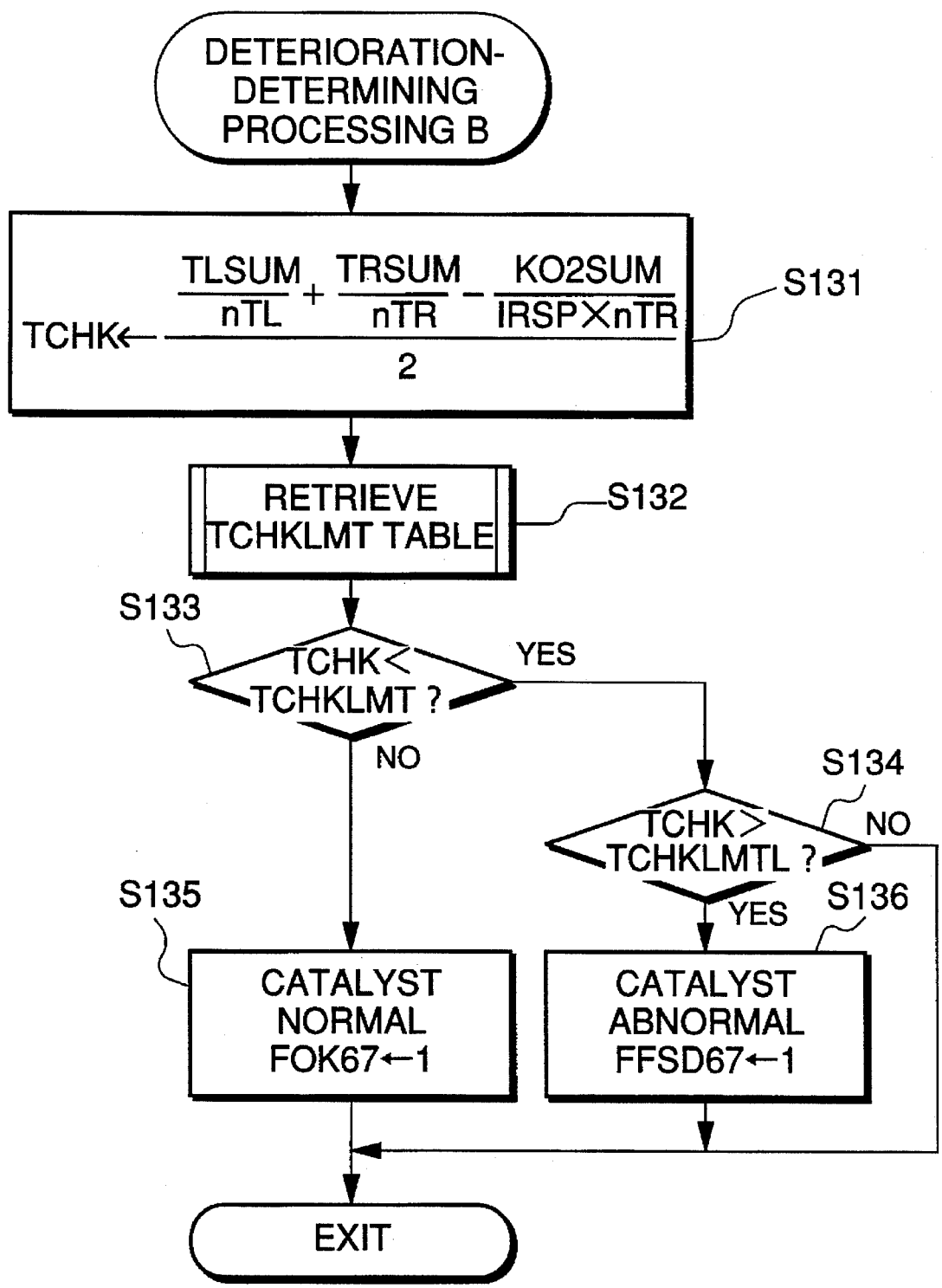
FIG. 11 is a flowchart showing a subroutine for a deterioration-determining processing B.

FIG. 11 shows a subroutine executed at the step S9 in FIG. 2 for the deterioration-determining processing B.

First at a step S131, a determination time period TCHK is calculated by the use of the following equation (6):

$$TCHK = [TLSUM/nTL + TRSUM/nTR - KO2SUM/(IRSP \times nIR)]/2 \quad (6)$$

where KO2SUM/(IRSP×nTR) represents a correction term corresponding to amounts of change in the correction coefficient KO2, which ensures an accurate catalyst deterioration determination even when the air-fuel ratio fluctuates. The reason for this will be described in detail hereinafter.

Figure 12:
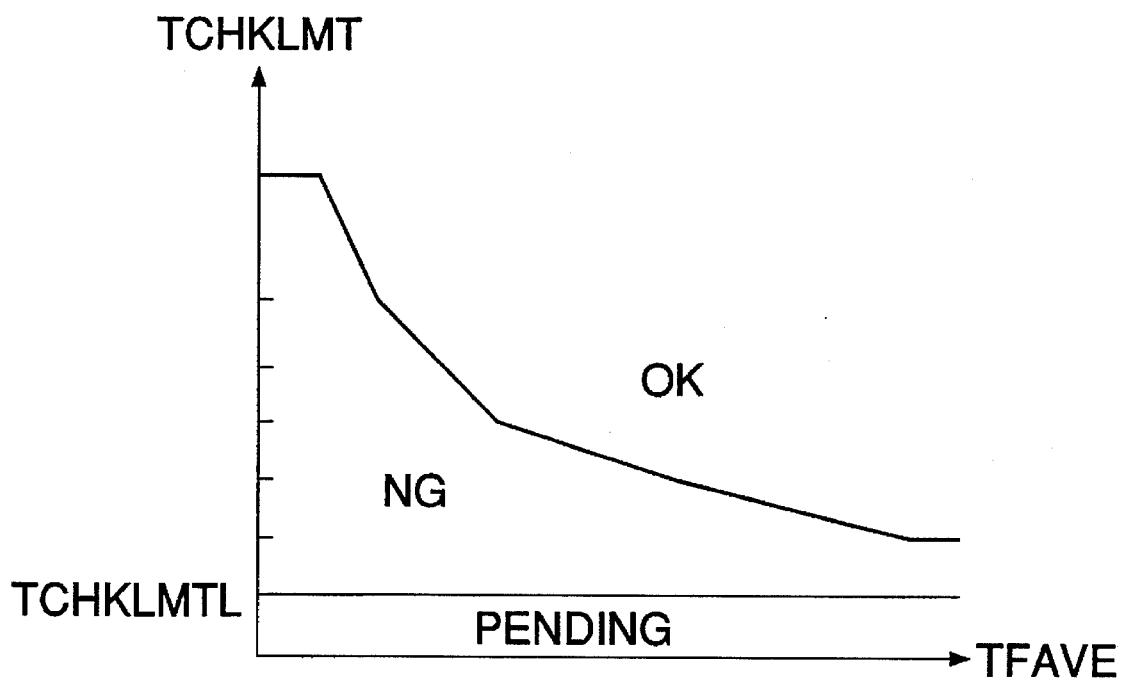
FIG. 12 shows a table used in calculating a deterioration determination value.

At the following step S132, a TCHKLMT table shown in FIG. 12 is retrieved to determine a determination threshold value TCHKLMT. In the figure, TFAV on the abscissa represents an average value of the intake air amount TF per unit time period of the engine 1. The intake air amount TF is proportional to the product of the basic fuel injection amount Ti and the engine rotational speed NE, and hence the value of Ti×NE or the product of the same and a constant is used for a value of the intake air amount TF, and the average value TFAVE is calculated by the use of a known averaging coefficient. It goes without saying that the intake air amount per se may be detected by a sensor as well. Further, TCHKLMTL represents a lower limit value of the determination time period TCHK, which is set to e.g. 200 msec.

Then, it is determined at a step S133 whether or not the determination time period TCHK is smaller than the determination threshold value TCHKLMT. If TCHK≧TCHKLMT, it is determined that the catalyst is not deteriorated, and the normal determination flag FOK67 is set to "1" at a step S135, followed by terminating the program.

On the other hand, if TCHK<TCHKLMT, it is further determined at a step S134 whether or not the determination time period TCHK is larger than the lower limit value TCHKLMTL. If TCHK>TCHKLMTL, it is determined that the catalyst is deteriorated, and an abnormality determination flag FFSD67 is set to "1" at a step S136, followed by terminating the program. On the other hand, if TCHK≦TCHKLMTL, the accuracy of the determination time period TCHK per se is dubious and hence the determination is made pending, followed by immediately terminating the processing.

Next, the correction term KO2SUM/(IRSP×nTR) of the equation (6) will be described with reference to FIGS. 13A and 13B.

In the figures, the solid lines represent KO2 and RVO2 curves assumed under a steady operating condition of the engine without fluctuations in the air-fuel ratio, whereas the broken lines represent KO2 and RVO2 curves assumed under an operating condition of the engine with fluctuations in the air-fuel ratio. Further, in the following description, values of the correction coefficient KO2 obtained at time points A to D, B' to D' are represented by KO2(A), KO2(B) ... KO2 (D').

Assuming that no correction term is provided, the determination time period TCHK during a steady operating condition of the engine is calculated by the following equation (7):

$$TCHK = ((TL1+TR1)/2+(TL2+TR2)/2+(TL3+TR3)/2)/3 \quad (7)$$

On the other hand, on the same assumption, the determination time period TCHK' during an operating condition of the engine with fluctuations in the air-fuel ratio is calculated by the following equations (8) and (9):

$$TCHK' = ((TL1'+TR1)/2+(TL2+TR2)/2+(TL3+TR3')/2)/3 \quad (8)$$

$$TL1' = TL1+TD1, \quad TR3' = TR3+TD2 \quad (9)$$

Accordingly, the determination time period TCHK can be corrected if time periods TD1 and TD2 appearing in the equation (9) depending upon fluctuations in the air-fuel ratio are determined.

Now, considering the value of the correction coefficient KO2 during the feedback control responsive to the output RVO2 from the downstream O2 sensor 16, an amount of change thereof in an enriching direction and an amount of change in a leaning direction are equal to each other under steady or constant operating conditions of the engine. Otherwise, the correction coefficient would diverge. Accordingly, values of the correction coefficient KO2 obtained immediately after subtraction of the special P term PLSP are all equal to each other, that is, KO2(A)=KO2(B)=KO2(C)=KO2(D).

In contrast, in the illustrated example of the engine operating condition with fluctuations in the air-fuel ratio, the KO2(A)≠KO2(B')=KO2(C')≠KO2(D'). Here, KO2(B') and KO2(D') are represented by the following equations (10) and (11):

$$KO2(B')=KO2(A)-(TL1'+TLD)\times I+PRSP+(TR1+TRD)\times I-PLSP \quad (10)$$

$$KO2(D')=KO2(C')-(TL3'+TLD)\times I+PRSP+(TR3+TRD)\times I-PLSP \quad (11)$$

provided that IRSP=ILSP=I

Further, KO2(B) and KO2(D) under steady operating conditions of the engine are represented by the following equations (12) and (13):

$$KO2(B)=KO2(A)-(TL1+TLD)\times I+PRSP+(TR1+TRD)\times I-PLSP \quad (12)$$

$$KO2(D)=KO2(C)-(TL3+TLD)\times I+PRSP+(TR3+TRD)\times I-PLSP \quad (13)$$

Accordingly, (KO2(B')−KO2(A)) is calculated as follows:

$$
\begin{aligned}
KO2(B') - KO2(A) &= KO2(B') - KO2(B) \quad (14)\\
&\quad (\because KO2(A) = KO2(B))\\
&= (TL1 - TL1') \times I\\
&\quad (\because \text{equation (10)} - \text{equation (12)})\\
&= -TD1 \times I\\
&\quad (\because \text{equation (9)})
\end{aligned}
$$

Further, the equation (11) minus the equation (13) gives:

$$KO2(D')-KO2(D)=KO2(C')-KO2(C)+(TR3'-TR3)\times I$$

Therefore, $$
\begin{aligned}
KO2(D') - KO2(C') &= KO2(D) - KO2(C) + \quad (15)\\
&\quad (TR3' - TR3) \times I\\
&= (TR3' - TR3) \times I\\
&\quad (\because KO2(D) = KO2(C))\\
&= TD2 \times I\\
&\quad (\because \text{equation (9)})
\end{aligned}
$$

Therefore, from the equations (14) and (15), TD1 and TD2 are obtained by the following equations (16) and (17):

$$TD1 = |KO2(B')-KO2(A)|/I \quad (16)$$

$$TD2 = |KO2(D')-KO2(C')|/I \quad (17)$$

From the equations (16) and (17), it can be understood that the correction term for eliminating adverse effects of fluctuations in the air-fuel ratio KO2 can be obtained by dividing the amount of change |KO2AF−KO2BF| in the immediately-after-PLSP value of the correction coefficient KO2 obtained immediately after generation of the special P term PLSP by the I term, and hence by dividing the cumulative value KO2SUM by IRSP×nTR. Thus, the equation (6) makes it possible to obtain the determination time period TCHK from which the influence of fluctuations in the air-fuel ration is eliminated.

As described above, even if the air-fuel ratio fluctuates during execution of the catalyst deterioration determination, it is possible to carry out an accurate deterioration determination by eliminating the influence of fluctuations in the air-fuel ratio through correction of the determination time period TCHK based on the cumulative value KO2SUM.

Further, since the deterioration monitoring is inhibited at the step S4 in FIG. 2 when the cumulative value KO2SUM is larger than the predetermined value, it is possible to prevent an inaccurate determination from being made when there is a large variation in the air-fuel ratio.

Although in the above embodiment, the inversion time periods TL, TR are set to time periods (T3, T5, T9 in FIG. 7B) from time points of execution of the proportional term control to time points of inversion of the output RVO2 from the downstream O2 sensor 16, this is not imitative, but they may be set to time intervals (T2+T3, T4+T5, T8+T9) of inversion of the downstream O2 sensor RVO2.

What is claimed is:

1. In a catalyst deterioration-detecting system for an internal combustion engine having an exhaust system, catalyst means arranged in said exhaust system for purifying exhaust gases emitted from said engine, oxygen concentration-detecting means arranged in said exhaust system at a location downstream of said catalyst means, for detecting concentration of oxygen in said exhaust gases, air-fuel ratio control amount-calculating means responsive to an output from said oxygen concentration-detecting means, for calculating an air-fuel ratio control amount, air-fuel ratio control means for controlling an air-fuel ratio of a mixture supplied to said engine by the use of said air-fuel ratio control amount, and catalyst deterioration-detecting means for detecting deterioration of said catalyst means based on said output from said downstream oxygen concentration-detecting means during execution of air-fuel ratio control by said air-fuel ratio control means, the improvement wherein said catalyst deterioration-detecting means detects deterioration of said catalyst means based on a value of a catalyst deterioration parameter indicative of a degree of deterioration of said catalyst means, and an amount of variation in said air-fuel ratio control amount.

2. A catalyst deterioration-detecting system according to claim 1, wherein said amount of variation in said air-fuel ratio control amount is a cumulative value of a difference between two adjacent values of said air-fuel ratio control amount measured immediately after proportional term control carried out by said air-fuel ratio control means.

3. A catalyst deterioration-detecting system according to claim 2, wherein said amount of variation in said air-fuel ratio control amount is an average value of said cumulative value of said difference between two adjacent values of said air-fuel ratio control amount over a predetermined time period.

4. A catalyst deterioration-detecting system according to claim 3, wherein said catalyst deterioration parameter is a time period from execution of said proportional term control to inversion of said output from said oxygen concentration-detecting means, said catalyst deterioration-detecting means detecting said deterioration of said catalyst means by the use of an amount obtained by subtracting an amount ascribed to said amount of variation in said air-fuel ratio control amount obtained by dividing said cumulative value of said difference between two adjacent values of said air-fuel ratio control amount over said predetermined time period by an integral term applied in said air-fuel ratio control, from an average value of said catalyst deterioration parameter over said predetermined time period.

5. A catalyst deterioration-detecting system according to claim 1, wherein said catalyst deterioration-detecting means further includes deterioration detection-inhibiting means for inhibiting detection of deterioration of said catalyst means when said amount in variation of said air-fuel ratio control amount exceeds a predetermined value.

6. In a catalyst deterioration-detecting system for an internal combustion engine having an exhaust system, catalyst means arranged in said exhaust system for purifying exhaust gases emitted from said engine, upstream oxygen concentration-detecting means arranged in said exhaust system at a location upstream of said catalyst means, for detecting concentration of oxygen in said exhaust gases, downstream oxygen concentration-detecting means arranged in said exhaust system at a location downstream of said catalyst means, for detecting concentration of oxygen in said exhaust gases, air-fuel ratio control means responsive to at least one of an output from said upstream oxygen concentration-detecting means and an output from said downstream oxygen concentration-detecting means, for controlling an air-fuel ratio of a mixture supplied to said engine, and catalyst deterioration-detecting means for detecting deterioration of said catalyst means based on said output from said downstream oxygen concentration-detecting means during execution of air-fuel ratio control by said air-fuel ratio control means, the improvement wherein said catalyst deterioration-detecting means comprises:

determination time period-measuring means for measuring a determination time period during which said output from said upstream oxygen concentration-detecting means is on an opposite side with respect to a predetermined value to said output from said downstream oxygen concentration-detecting means; and inhibiting means for inhibiting detection of deterioration of said catalyst when said determination time period measured by said determination time period-measuring means exceeds a predetermined time period.

7. A catalyst deterioration-detecting system according to claim 6, wherein said catalyst deterioration-detecting comprises detecting means for detecting a variation in said output from said downstream oxygen concentration-detecting means, over a predetermined time period, and determining means for determining that said catalyst means is normal when said determining time period measured by said determination time period-measuring means exceeds said predetermined time period.

* * * * *